G. GABLE.
STALK CUTTER.
APPLICATION FILED NOV. 4, 1916.

1,237,194.

Patented Aug. 14, 1917.
2 SHEETS—SHEET 1.

Witnesses

Inventor
Gus Gable
By Victor J. Evans
Attorney

G. GABLE.
STALK CUTTER.
APPLICATION FILED NOV. 4, 1916.
1,237,194.
Patented Aug. 14, 1917.
2 SHEETS—SHEET 2.
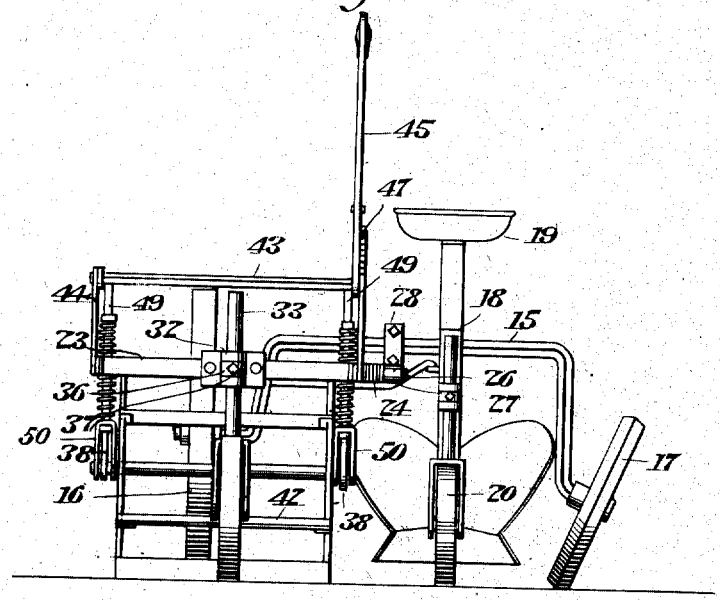
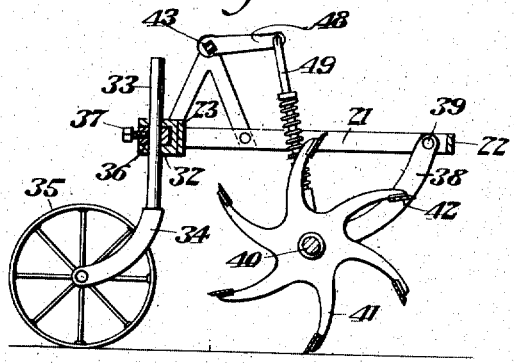
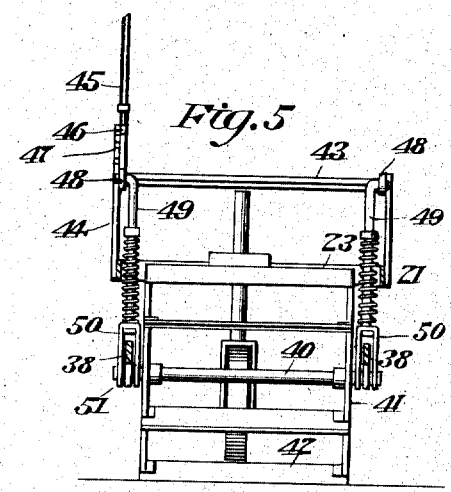
Witnesses
Inventor
Gus Gable
By Victor J. Evans
Attorney

UNITED STATES PATENT OFFICE.

GUS GABLE, OF DAWSON, TEXAS.

STALK-CUTTER.

1,237,194. Specification of Letters Patent. Patented Aug. 14, 1917.

Application filed November 4, 1916. Serial No. 129,570.

*To all whom it may concern:*

Be it known that I, GUS GABLE, a citizen of the United States, residing at Dawson, in the county of Navarro and State of Texas, have invented new and useful Improvements in Stalk-Cutters, of which the following is a specification.

This invention relates to stalk cutters, and it has particular reference to an improved stalk cutting attachment for various agricultural machines such, for instance, as a riding plow, a lister, a middle burster or the like.

The invention has for its object to produce a simple and effective stalk cutting device which may be readily attached to and used in connection with a plow or tilling machine of any well known type so as to operate in conjunction therewith without materially increasing the draft, thereby saving the use of additional draft animals and also the labor of one man.

A further object of the invention is to simplify and improve the construction of the stalk cutting device, its supporting frame and the manner of mounting the same for operation.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Fig. 3 is a rear view.

Fig. 4 is a sectional detail view taken on the line 4—4 in Fig. 1.

Fig. 5 is a sectional detail view taken on the line 5—5 in Fig. 2.

Corresponding parts in the several figures are denoted by like characters of reference.

Figure 1:
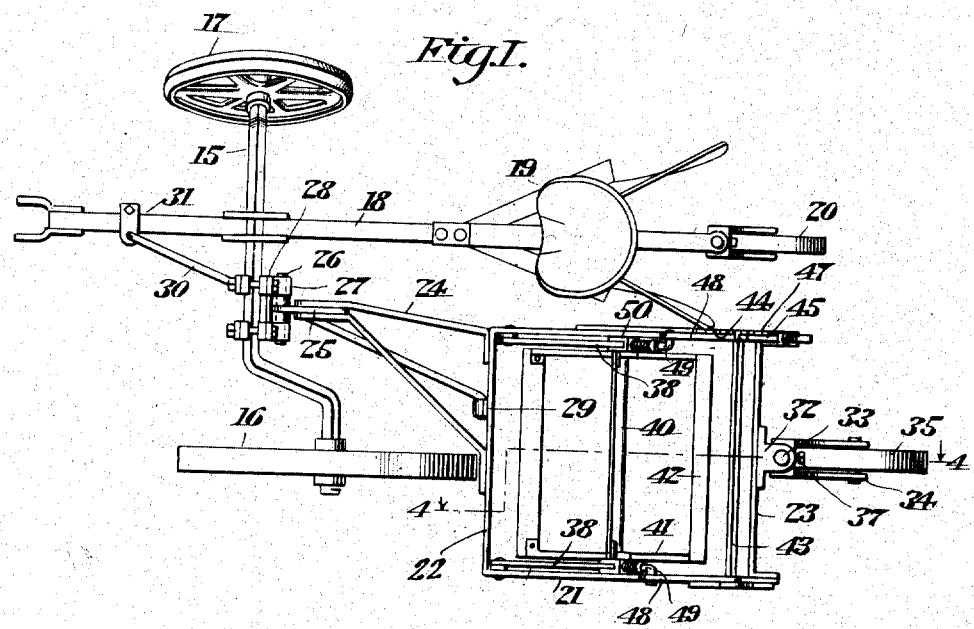
Figure 1 is a top plan view showing the improved stalk cutter operatively applied to a lister.
Figure 2:
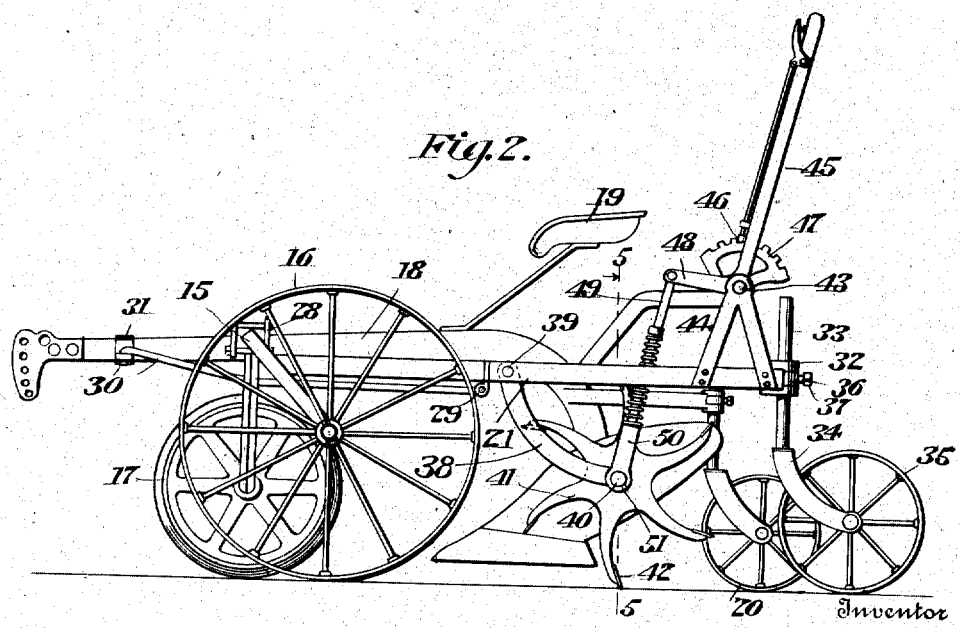
Fig. 2 is a side elevation of the same.

15 designates the axle; 16, 17 the land and furrow wheels; 18 the beam; 19 the seat, and 20 the trailer wheel of an ordinary lister, the same having been only conventionally illustrated with the omission of details that do not pertain to the present invention.

The stalk cutter includes a rectangular frame consisting of side members 21 and front and rear members 22, 23. Bolted or otherwise secured upon the front member 22 are obliquely disposed brackets 24 including between them a connecting bar 25 having at its forward end a transversely disposed shaft 26 for which bearings 27 are provided in clip plates 28 that are clamped on the axle 15 of the lister. The front member 22 is also provided with a clamp 29 which is connected by a brace rod 30 with a clamp 31 mounted on the lister beam 18.

The rear member 23 of the rectangular frame of the stalk cutter carries vertically disposed bearing sleeves 32 for a shaft or spindle 33 terminating at its lower end in a fork 34 which supports a trailer wheel 35. The bearing sleeves 32 are disposed in axial alinement, and the shaft 33 carries a set collar 36 which is positioned intermediate the bearing sleeves and which is provided with a set screw 37. It will be seen that the shaft carrying the trailer wheel is free to rotate in the bearing sleeves, and that by proper adjustment of the set collar on the shaft, vertical adjustment of the rearward portion of the cutter frame may be effected.

The side members 21 are provided near their forward ends with arms or links 38 swingingly connected therewith by pivot members 39, said arms or links affording bearings for a shaft 40 carrying spiders 41 with which the stalk cutting blades 42 are connected. A rock shaft 43 extends transversely across the cutter frame, said rock shaft being supported on brackets 44. The rock shaft carries a lever 45 having a stop member 46 engaging a rack segment 47. The rock shaft also has cranks 48 which are connected with arms 49 extending upwardly from yokes 50 that straddle the arms or links 38, and the limbs of which are each provided with an eye 51 engaging the shaft 40. It will be readily seen that by manipulating the lever 45 the cutter carrying shaft may be lowered or raised to move the cutter in or out of engagement with the stalks that are to be cut. It will also be obvious that by proper adjustment of the lever with regard to the segment rack by means of the stop member 46, pressure may be brought to bear on the cutter whereby the latter will be forced to penetrate to the desired depth to insure the perfect chopping of the stalks.

From the foregoing description, taken in connection with the drawings hereto annexed, the operation and advantages of this invention will be readily understood. It will be seen that the stalk cutting attachment may be readily applied to and used in connection with any plow or tilling machine having an axle and a beam or the equivalents of these members, the draft from the cutter frame being distributed partly on the axle and partly on the beam through the medium of the draft bars 24 and the brace 30. It is obvious that by properly arranging the draft bars and the brace, the cutter frame may be applied either at the right or the left side of the tilling machine, it being only necessary to extend the draft bars and the brace obliquely to the right or to the left with respect to the cutter frame, as may be required. The cutter frame will be capable of swinging freely about the axis of the shaft 26, whereby it is connected with the plow axle, and the trailer wheel which supports the rearward portion of the cutter frame is capable of vertical adjustment to meet any conditions that may arise. The rotary cutter formed by the spiders and the cutting blades connected therewith will revolve freely by engagement with the ground and the stalks about to be cut, and it may be adjusted vertically so as to penetrate the desired depth or to move it to a raised position for transportation. The improved stalk cutting attachment may be manufactured and sold at a moderate cost, and it may be readily assembled with any well known plow or tilling machine, thereby saving the team and the labor of one man which is required when a stalk cutter separate from the tilling machine is used.

Having thus described the invention, what is claimed as new, is:—

1. In a device of the class described, a rectangular frame having forwardly extending obliquely disposed brackets, a draft bar secured between said brackets and having a transversely disposed shaft, clamp members having eyes affording bearings for said transverse shaft, a vertically adjustable rotary shank mounted on the rearward part of the rectangular frame, said shank having a fork and a caster wheel journaled therein, and a rotary cutting element swingingly supported within the rectangular frame.

2. In a device of the class described, a rectangular frame having forwardly extending obliquely disposed brackets, a draft bar secured between said brackets and having a transversely disposed shaft, clamp members having eyes affording bearings for said transverse shaft, a vertically adjustable rotary shank mounted on the rearward part of the rectangular frame, said shank having a fork and a caster wheel journaled therein, and a rotary cutting element swingingly supported within the rectangular frame.

3. In a device of the class described, the combination with a tilling machine having a wheel supported axle and a beam, of a stalk cutting attachment comprising a rectangular frame having forwardly extending obliquely disposed brackets, a draft bar secured between the brackets and having a transverse shaft, clamp members mounted on the axle and having bearings for the transverse shaft, a clamp fixed on the front member of the rectangular frame, a clamp fixed on the beam of the tilling machine, a brace member connected at its front and rear ends with said clamps, rotary supporting means for the rearward end of the cutter frame, and a rotary cutting element swingingly supported within the frame.

4. In a device of the class described, the combination with a tilling machine having a wheel supported axle and a beam, of a stalk cutting attachment comprising a rectangular frame having forwardly extending obliquely disposed brackets, a draft bar secured between the brackets and having a transverse shaft, clamp members mounted on the axle and having bearings for the transverse shaft, a clamp fixed on the front member of the rectangular frame, a clamp fixed on the beam of the tilling machine, a brace member connected at its front and rear ends with said clamps, rotary supporting means for the rearward end of the cutter frame, and a rotary cutting element swingingly supported within the frame; and means for effecting vertical adjustment of the cutting element and for securing it at various adjustments.

In testimony whereof I affix my signature.

GUS GABLE.

Copies of this patent may be obtained for five cents each, by addressing the "Commissioner of Patents, Washington, D. C."